(No Model.) 8 Sheets—Sheet 1.

C. G. STRUBLER.
COIN CONTROLLED SCALE AND MEASURING AND LIFTING MACHINE.

No. 458,815. Patented Sept. 1, 1891.

(No Model.) 8 Sheets—Sheet 2.

C. G. STRUBLER.
COIN CONTROLLED SCALE AND MEASURING AND LIFTING MACHINE.

No. 458,815. Patented Sept. 1, 1891.

(No Model.) 8 Sheets—Sheet 3.

C. G. STRUBLER.
COIN CONTROLLED SCALE AND MEASURING AND LIFTING MACHINE.

No. 458,815. Patented Sept. 1, 1891.

Fig. 4.

Witnesses:
Fred Scherbach
Geo Elliott

Inventor:
Chas. G. Strubler
by Burton and Burton
Attorneys.

(No Model.) 8 Sheets—Sheet 4.

C. G. STRUBLER.
COIN CONTROLLED SCALE AND MEASURING AND LIFTING MACHINE.

No. 458,815. Patented Sept. 1, 1891.

Fig. 5.

Witnesses:
Fred Gerlach.
Jean Elliott.

Inventor:
Chas. G. Strubler
By Burton and Burton
Attorneys.

(No Model.) 8 Sheets—Sheet 6.
C. G. STRUBLER.
COIN CONTROLLED SCALE AND MEASURING AND LIFTING MACHINE.

No. 458,815. Patented Sept. 1, 1891.

Witnesses:
Jean Elliott
Celeste P. Chapman

Inventor:
Chas. G. Strubler
By Burton and Burton
Attorneys

THE NORRIS PETERS CO., PHOTO-LITHO., WASHINGTON, D. C.

(No Model.) 8 Sheets—Sheet 7.
C. G. STRUBLER.
COIN CONTROLLED SCALE AND MEASURING AND LIFTING MACHINE.
No. 458,815. Patented Sept. 1, 1891.

Witnesses:
Fred Gerlach
Jean Elliott

Inventor:
Chas. G. Strubler
By Burton and Burton
Attorneys.

(No Model.) 8 Sheets—Sheet 8.

C. G. STRUBLER.
COIN CONTROLLED SCALE AND MEASURING AND LIFTING MACHINE.

No. 458,815. Patented Sept. 1, 1891.

Witnesses:
Jean Elliott.
Julia Usler.

Inventor:
Chas. G. Strubler
By Burton & Burton
his Attorneys

UNITED STATES PATENT OFFICE.

CHARLES G. STRUBLER, OF CHICAGO, ILLINOIS.

COIN-CONTROLLED SCALE AND MEASURING AND LIFTING MACHINE.

SPECIFICATION forming part of Letters Patent No. 458,815, dated September 1, 1891.

Application filed January 7, 1890. Serial No. 336,130. (No model.)

*To all whom it may concern:*

Be it known that I, CHARLES G. STRUBLER, a citizen of the United States, residing at Chicago, county of Cook, and State of Illinois, have invented certain new and useful Improvements in Coin-Controlled Weighing and Measuring and Lifting Machines, which are fully set forth in the following specification, reference being had to the accompanying drawings, forming a part thereof.

The purpose of this invention is to provide an improved mechanism for indicating the weight and height of and the amount lifted by the user and recording the same on a card delivered automatically from the machine.

Figure 4:
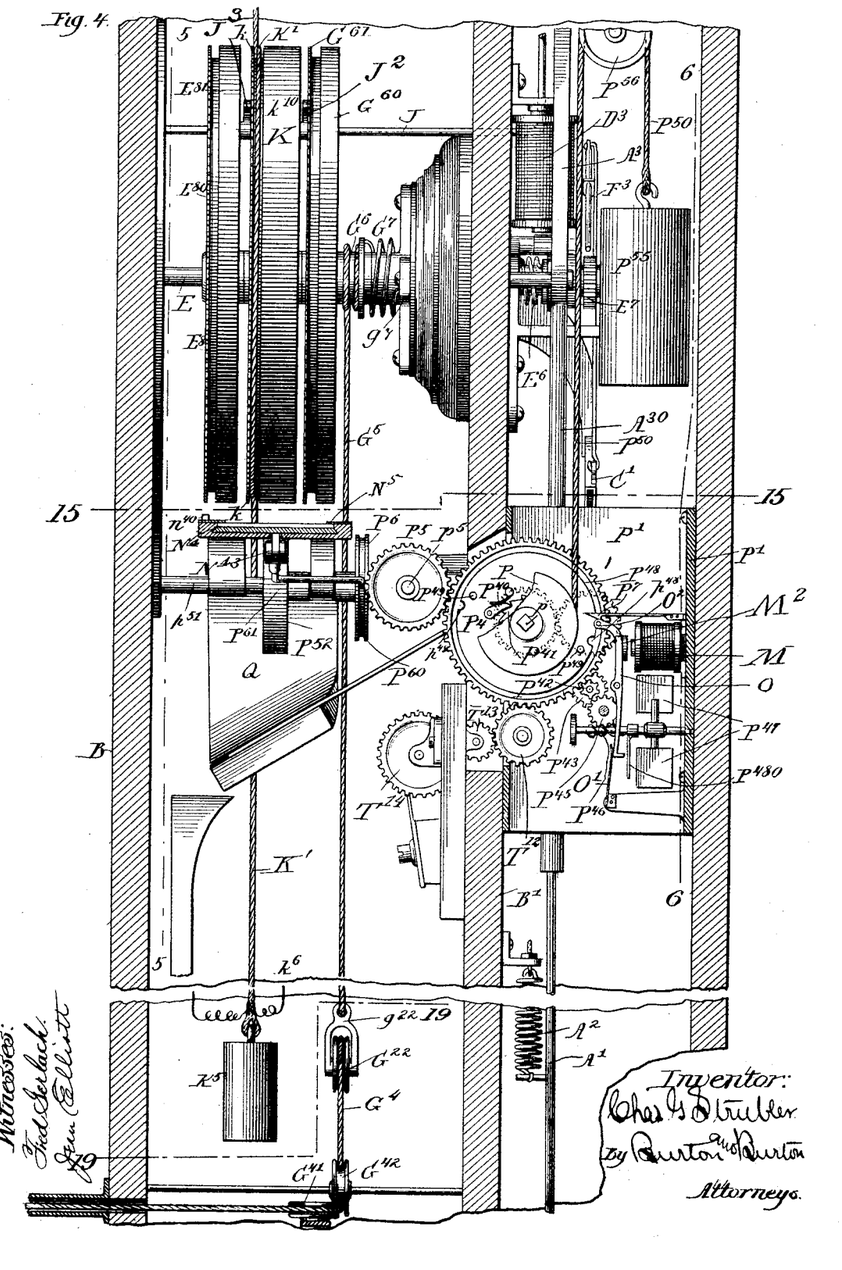
Fig. 4 is a right-side elevation of the mechanism contained in the upper part of the case, the right side of the case and the cord-receptacle being cut away to disclose it.

A is the scale-platform, on which the user stands in order to cause his weight to be indicated. It is supported by any suitable system of levers, such as pertain to any platform-scale and ultimately connected to and actuating the rod $A'$, the downward movement of the platform tending to pull the rod downward, such downward movement being resisted by the spring $A^2$, Fig. 4. The rod $A'$ telescopes with the tubular extension $A^{30}$ of the rack-bar $A^3$ (see Fig. 6) and is provided with a stop-collar $A^{10}$, which stops against the end of the tubular extension to limit the telescoping. The rack-bar has the slot $A^{31}$, by which it is guided on the stud $A^{32}$, which is fixed on the wooden partition $B'$, which forms part of the case or frame B.

$b$ is the coin-aperture in the front of the wall of the case.

C is the fixed part of the coin-chute, leading from said aperture rearwardly along the left side of the case through the partition $B'$ and discharging downward into the tilting part $C'$ of the coin-chute.

D is an electric battery, from one pole of which the circuit-wire $D'$ extends to the tilting chute $C'$, while from the other pole the wire $D^{10}$ extends to the electro-magnet $D^3$, and thence to the contact-button $D^4$, which is fixed at a short distance from the open end of the tilting chute in such position that a coin of the proper dimension reaching the end of the chute will contact the button while still in contact with the chute, and so complete the circuit and cause the electro-magnet $D^3$ to be energized.

The circuit $D^{10}$ has a gap between the button $D^{100}$ and the end of the spring $D^{101}$, which is closed only when the rod $A'$ having descended causes the collar $A^{10}$, and afterward the tubular stem A³⁰, to crowd the spring over and make it contact the button D¹⁰⁰. The spring has a non-conducting sheath D¹⁰² on its side toward the rod, which receives the contact of the collar and the stem. The circuit therefore cannot be closed except by depressing the platform at least sufficiently to cause the collar to move the spring.

The armature D⁵ is pivoted on the bracket D⁵⁰, and when free from the magnet operates by means of its oscillating end as a locking-dog, engaging the notch E³⁰ on the disk E³. Said disk is rigid with the gear-wheel E⁴, which is engaged by the rack-bar A³, and both said disk and gear-wheel are loose on the shaft E, which is journaled in the frame and has the index-hand E' secured on its forward end, which protrudes from the case at the center of the dial E², so that the index-hand travels about said dial as the shaft revolves.

Figure 6:
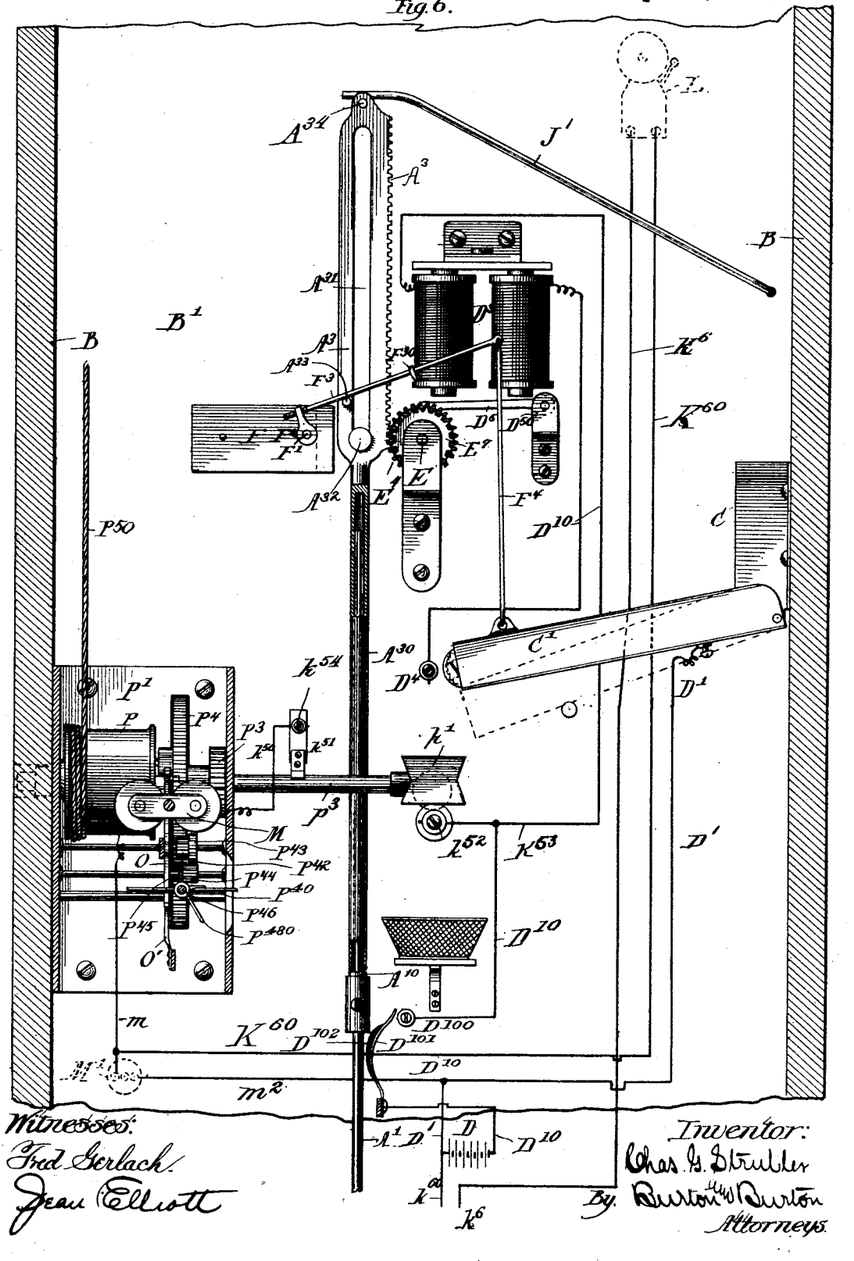
Fig. 6 is a section at 6 6 on Fig. 4.
Figures 7, 8, 9, 10, 11, 12, 13, 14:
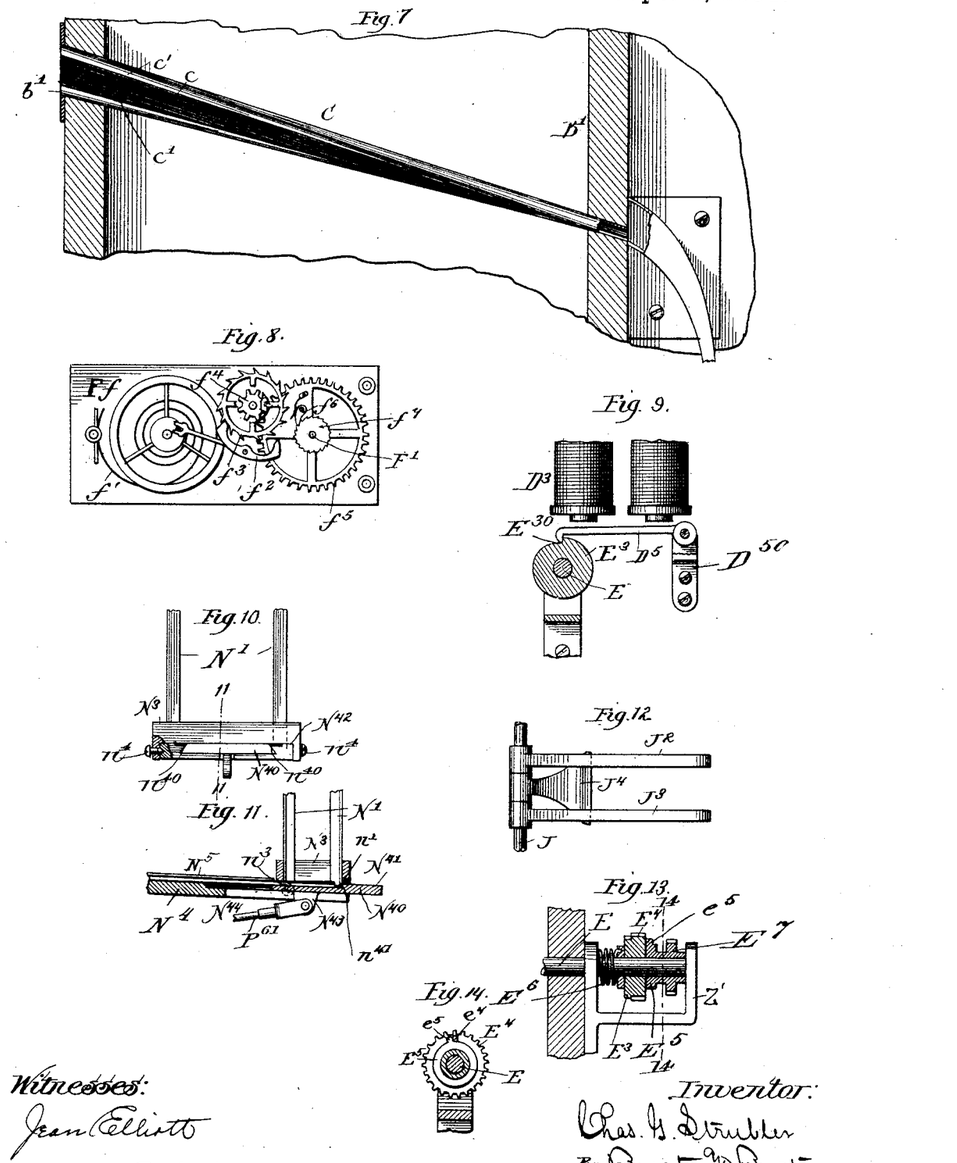
Fig. 7 is a section from front to rear through the coin-chute.
Fig. 8 is a detail elevation of a retarded train of mechanism which controls a lock for the registering mechanism.
Fig. 9 is a sectional detail elevation of an electro-magnet and the armature which acts as a dog to lock the registering mechanism, of which the engaged wheel is shown, section being made at 9 9 on Fig. 3.
Fig. 10 is a detail inner end elevation of the printing platen or bed and the lower part of the card-receptacle, to which it is pivoted, partly broken away and shown in section at its pivot.
Fig. 11 is a section at 11 11 on Fig. 10.
Fig. 12 is a detail plan of locking parts for preventing reversion of the registering-wheels.
Fig. 13 is an axially-sectional elevation of mechanism assembled on the rear part of the shaft of the registering-wheels, by which said shaft is actuated.
Fig. 14 is a section at 14 14 on Fig. 13.

Fast on the shaft E, alongside of the wheel E⁴, is the disk E⁵, which has a stop-tooth e⁵, adapted to engage the laterally-projecting stud e⁴ on the gear-wheel E⁴. (See Fig. 14.) The armature-dog D⁵, engaging the notch E³⁰ in the disk E³ and locking it and the gear-wheel E⁴, determines the position at which the disk E⁵ and the shaft E and index-hand E' will be arrested in their reverse rotation, and is arranged to cause the stoppage of the hand at the zero-point on the dial. When the parts are in the position shown in Fig. 6, the stud e⁴ is in engagement with the tooth e⁵, so that the rotation of the gear-wheel E⁴ in the direction in which it would be actuated by the descending rack rotates the shaft. A spring E⁶ is coiled around the shaft E and has one end fast to it, and is fastened at the other end to the frame-bracket Z', said spring tending to resist the rotation of the shaft E in the direction caused by the descent of the rack, which is the direction which causes the index-finger E' to move over the dial from left to right.

When the rod A' has been depressed by the weight on the platform, if the proper coin has also been dropped into the coin-chute, the armature D⁵ having been lifted from the disk E³ and said disk and the gear E⁴ thereby made free to rotate, the rack-bar A³ descends by its weight and rotates the gear-wheel E⁴ and disk E³, and by reason of the engagement of the stud e⁴ and tooth e⁵ rotates also the shaft E.

F is a case (see Figs. 6 and 8) containing a train of mechanism controlled by a balance-wheel or equivalent time-regulating mechanism. I have shown a balance-wheel $f$ and its controlling hair-spring $f'$, the escapement-lever $f^2$, the escape-wheel $f^3$, the pinion $f^4$ on the escape-wheel shaft actuated by the main gear-wheel of the train $f^5$, which is loose on its shaft F' and has a pawl $f^6$, which engages the ratchet-wheel $f^7$, fast on said shaft, which protrudes from the case F and has the collar F² secured to it outside the case, and to this collar there is rigidly secured the lever-arm F³, which extends past the side of the rack-bar A³, over a pin A³³, projecting from said bar, and thence on transversely above the shaft E, and at its farther end, beyond the shaft E, there is connected to it the link F⁴, which extends downward and is connected to the tilting chute C', whereby the oscillating end of said chute is sustained. When the rack-bar A³ descends, the pin A³³, withdrawing from beneath the lever F³, ceases to sustain it, and the weight of said lever and link F⁴ and chute C' constitute a motive power which actuates the mechanism in the case F, bringing into operation its balance-wheel or other regulating mechanism controlling the movement of the shaft F', and so the descent of the parts connected to the lever F³, so that they do not descend as rapidly as they would by the mere operation of gravity.

Upon the lever F³ there is fixed the tooth F³⁰, adapted to engage the wheel E⁷, which is fast on the shaft E and located in the vertical plane of said lever, so that the descent of the lever brings the tooth F³⁰ into engagement with the wheel E⁷, and when this occurs locks the shaft E against rotation, and thereby prevents movement of the rack-bar A³ in either direction. The purpose of this mechanism is to prevent repeated weighings without the deposit of additional coin, and it serves this purpose in the following manner: When the coin has been deposited and the platform weighted by the user standing upon it, the rod A' having been depressed so that the rack A³ can descend and the circuit through the electro-magnet D³ being closed by the coin resting in the end of the chute against the button D⁴, whereby the armature-dog D⁵ had been disengaged from the disk E³, permitting the rack-bar A³ to rotate the wheel E⁴ as the rack-bar descends, said rack-bar will fall promptly, restrained only by the amount of work done in the rotation of the shaft E and its index-hands and wheels and the coiling of the spring E⁶; but the lever F³, controlled by the mechanism in the case F, will descend more slowly, so that the rack-bar will have reached its downward limit and will have been stopped by the rod A' before the lever F³ has completed its descent, so that its tooth F³⁰ can engage with the wheel E⁷; but the amount of the retardment of the fall of the lever will be so regulated that the interval after the arrest of the downward movement of the rack-bar A³ and the consequent rotary movement of the shaft E and its index-hand and wheels will be too slight to permit the operator to observe the position of the index-hand on the dial and thereafter add other weight to cause the rod A' to be further depressed and permit the rack A³ to descend farther, so that in practice only one weight can be registered and observed upon the deposit of a single coin, and any subsequent weight placed upon the scale after the first is indicated by the index-hand will fail to cause any indication upon the dial or any action of the weight-registering mechanism within the case, the effect of such subsequent weight being limited to the depression of the rod $A'$, which will simply slide down within the tubular extension $A^{30}$ of the rack-bar $A^3$, the latter being unable to follow it in such additional descent on account of being held fast by its engagement with the wheel $E^4$, whose shaft $E$ will be locked by the engagement of the tooth $F^{30}$ with its wheel $E^7$.

When the weight is removed from the platform, the action of the spring $A^2$ restores the rod $A'$ to its initial position, and said rod in rising pushes up the rack-bar $A^3$, whose pin $A^{33}$ lifts the lever $F^3$, the shaft $F'$ being connected to the first wheel of the train in the case $F$ by a pawl and ratchet, and restores the chute $C'$ to its initial position, disengaging the tooth $F^{30}$ from the wheel $E^7$.

The position of the pin $A^{33}$ on the rack-bar is such that it encounters the lever $F^3$ only a very short distance before it reaches its highest position, so that the shaft $E$ remains locked and the index-hand prevented from reversing on the dial until the rack-bar has nearly reached the position of rest. The purpose of this is to prevent indicating the weight of more than one person upon deposit of a single coin by having two or more persons mount the scale at once and step off one at a time. If this should be attempted, no change in the indication on the dial would occur when the weight on the platform was diminished unless the diminution reduced it to a very small amount, such an amount as would be indicated by the rotation of the shaft a distance corresponding to the distance from the position at which the pin $A^{33}$ encounters the lever $F^3$ to its position of rest, and this will be made less than the least possible weight of one person.

It will be observed that by reason of the fact that the wheel $E^4$ is not fast on the shaft $E$ the upward motion of the rack-bar does not directly rotate the shaft $E$, and therefore the fact that said shaft is locked fast by the tooth $F^{30}$ engaged with the wheel $E^7$, offers no hindrance to the rotation of the wheel $E^4$ and disk $E^3$, even before the rack-bar has risen far enough so that its pin will lift the lever $F^3$ and disengage the tooth. The sudden rising of the rod $A'$, causing its collar $A^{10}$ to collide against the lower end of the rack-bar, will cause the rack-bar to be thrown up a little beyond the point to which it would be lifted by the rod $A'$ if its motion were slow, and it will thereby rotate the gear $E^4$ and disk $E^3$ a little beyond the point where the dog $D^5$ could engage the tooth $E^{30}$. The rack-bar will, however, settle down to the proper point, and will be stopped accurately at that point by the engagement of the dog with said tooth, the overactuation serving only to insure that the dog will pass the tooth, so that it cannot fail to engage it when the bar settles. The spring $E^6$ tends to rotate the shaft $E$ in the same direction in which it would be rotated by the rising movement of the rack-bar $A^3$ if the wheel $E^4$ were fast upon the shaft, and as soon as the tooth $F^{30}$ is disengaged from the wheel $E^7$, so that said wheel and its shaft are released and yield to the action of the spring $E^6$, and the index-finger returns to the zero-point upon the dial, the shaft being stopped at precisely the right point by the engagement of the stud $e^1$ and tooth $e^5$, the position of the wheel $E^4$ having already been accurately fixed by the dog $D^5$, as described. The spring $E^6$, however, is comparatively light, being only sufficient to give the necessary motion to the parts which it actuates, as stated; and one purpose of this construction is to prevent the sudden and violent action which the necessarily-strong spring $A^2$ produces and would communicate to the shaft $E$ and its wheels and index-finger if they were actuated by said spring, as would be the case if the connection of the wheel $E^4$ to the shaft $E$ were rigid, so that the movement of the rack-bar caused by the spring $A^2$ is the cause of the reversing movement of the shaft $E$ and its index-finger.

It will be observed that the descent of the tilting chute $C'$ consequent upon the downward movement of the rack-bar $A^3$, withdrawing the supporting-pin $A^{33}$ from underneath the lever $F^3$, will permit the coin to drop from the end of the chute, and thereby to open the circuit which has energized the electro-magnet $D^3$, and that this will have occurred before the reverse movement of the parts has commenced, so that when that reverse movement is made the armature-dog $D^5$ is in position to engage the notch $E^{30}$ on the disk $E^3$ and check the reverse movement of the shaft $E$ when the index-finger is at the zero-point. The further progress of the coin will be hereinafter explained in connection with subsequent operations.

I will now describe the mechanism for testing the lifting-power of the operator. It comprises the handles $G\ G$, screwed into the disks $G'$, which are adapted to play up and down within the tubular standards $G^2\ G^2$, rigid with the base of the machine, one on each side of the scale or platform $A$. The resistance to the upward pull of the handles consists of extensible springs $G^3$, attached to the disks at one end and to the base of the standards $G^2$ at the other end. These springs are designed to be substantially equal in tension, and the position of the handles $G$ can be adjusted by screwing them up or down in the disks $G'$ to the desired position suited to the operator. Above the disks $G'$ on the handle-rods $G$ are located loose collars $G^{300}$, and above these collars, coiled on the handle-rods, are the springs $G^{30}$, which react between the collars and the caps $g$, which close the tops of the standards. To the side of the collars, respectively, the two ends of the cable $G^4$ are connected, and said cable passes out from the standard around guide-pulleys $G^{40}$, through the tubular brace-arms $G^{21}$, which extend from the upper ends of the standards to the case, and through apertures in front of the case and partly around guide-pulleys $G^{41}$ and $G^{42}$ inside the case. Within the case a pulley $G^{22}$ in the pulley-block $g^{22}$ runs on the cable between the pulleys $G^{42}$, and to the eye of the pulley-block a cable $G^5$ is connected, and extends thence upward and is wound around and at the end secured to the windlass $G^6$, which is formed on the hub of a wheel $G^{60}$, which is journaled on a sleeve H, which is in turn journaled on the shaft E. The reason for interposing this sleeve H will hereinafter appear. It will be obvious that the wheel $G^{60}$ may be treated as journaled directly on the shaft E for all the purposes of its own action. To the hub of the wheel $G^{60}$ one end of the spring $G^7$ is secured, the other end of which is fastened to the bearing $g^7$ of the shaft E in the frame, the spring being coiled on the shaft in a direction to wind up the cable $G^5$ on the windlass. The upward pull of either handle G will slack the cable $G^4$ and yield the cable $G^5$, which will be wound upon the windlass $G^6$ by the action of the spring $G^7$. If all the pull is exerted on one handle G, the same exertion will enable the operator to pull it twice as far as if he were pulling both handles; but the total slackening of the cable $G^5$ will only be the same as if he had pulled half as far on both handles, and hence the amount of cable $G^5$ yielded to the windlass $G^6$ and the distance which the wheel $G^{60}$ is rotated will be the same in both cases. When the operator releases the handles, the disks $G'$ will be pulled down by the springs $G^3$, and the tendency of the springs $G^{30}$ will be to immediately retract the cables $G^4$ and $G^5$ and reverse the rotation of the wheel $G^{60}$, and the strength of the springs $G^{30}$ is sufficiently greater than that of the spring $G^7$ to accomplish this; but in order to prevent this result until after the pull made has been printed on the card I provide the following mechanism: The periphery of the wheel $G^{60}$ has a notched rim $G^{61}$, and to the case there is pivoted the rock-shaft J, which has an arm $J'$, extending from the partition $B'$ and resting upon the upper end of the rack-bar $A^3$, from which a suitable stud $A^{34}$ projects to afford lodgment for the said lever-arm $J'$. On the rockshaft J are loosely hung locking-dogs $J^2$ and $J^3$, and rigid with said rock-shaft is the arm $J^4$, which extends under said locking-dogs and is adapted to uphold them when the rock-shaft is properly placed. When the rack-bar $A^3$ is at its highest position, as seen in Fig. 6, it holds the lever-arm $J'$ up to such a position that the arm $J^4$ of the rock-shaft uplifts the dogs $J^2$ and $J^3$ to the position shown in Fig. 5. One of these dogs $J^2$ is in the plane of the toothed rim $G^{61}$ of the wheel $G^{60}$, and adapted when properly brought into engagement with said rim to arrest and detain the wheel against rotation under the action of the spring $G^{30}$.

The descent of the rack-bar $A^3$, which results from the presence of the weight upon the platform, which depresses the rod $A'$, as described, permits the lever-arm $J'$ of the rock-shaft to fall and the lever-arm $J^4$ of said rock-shaft to withdraw from underneath the dogs $J^2$ and $J^3$, which then drop down onto the wheels, which they respectively engage, the dog $J^2$, as stated, engaging the rim $G^{61}$, so that the wheel $G^{60}$ is rotated by the spring $G^7$ to the extent permitted by the slacking of the cable $G^5$, the pull-handles G being released the dog $J^2$ engages and locks the wheel $G^{60}$ at the position to which it has been thus rotated, and holds it in that position until the dog is again lifted, which will not occur until the weight is removed from the platform, causing the rack $A^3$ to be again lifted. The wheel $A^{60}$ has, besides the peripherally-toothed rim $G^{61}$, the rim $G^{62}$, which is encircled by a rubber ring $G^{63}$, containing type-faces adapted to imprint numbers indicating the extent to which the wheel is rotated, and hence the strain exerted by the pull-rods. The mechanism by which this device is caused to print and thereby record the pull exerted will be hereinafter explained.

I will now describe the mechanism for indicating and recording the height. On the shaft E, and more specifically on the sleeve H, which is extended rigidly from the bearing of said shaft, I make fast the wheel K. This wheel has a peripheral groove similar to that in the periphery of the wheel $G^{60}$, and around said wheel in said groove I wind the insulated wire cable $K'$, composed of two wires insulated from each other, said cable extending upward from the wheel through the tubular bracket $K^2$ and around the guide-pulley $k^2$, and thence horizontally through the arm $K^3$ forward to and over the guide-pully $k^3$, which is located vertically above the platform A. Said cable extending slightly below said guide-pulley, is connected to the depending stop $K^4$, said stop containing the push-button $k^4$ and the usual devices whereby the push-button may effect electrical connection between the two wires of said cable $K'$ within the stop $K^4$. The cable passes down from the wheel K, and to its lower end there is suspended the weight $K^5$. The two wires of said cable are electrically connected one by the wire $k^6$ to the bell L, and thence by the wire $k^{60}$ and $m$ to the electro-magnet M, connected with the printing mechanism hereinafter described, and thence by the wire $k^{50}$ to the contact-piece $k^{51}$, with the shaft $p^3$ which pertains to the printing mechanism, and thence by the coin (when the latter is contained in the hopper $p'$ on the end of the shaft $p^3$, as hereinafter explained) to the contact-button $k^{52}$, and thence by the wire $k^{53}$ with the wire $D^{10}$, which leads to one pole of the battery, and the other by the wire $k^5$ directly to the other pole of the battery.

The operator standing upon the platform desiring to measure his height, will seize the stop $K^4$ and draw it down until the push-button $k^4$ is in contact with the top of the head and sufficiently depressed to close the circuit in the stop $K^4$. If when this is done the coin is in the position shown in Fig. 6, in dotted line, in the hopper $p'$, connecting the button $K^{52}$ electrically with the shaft $p^3$, the circuit described will be closed through the electro-magnet M and the bell L, and the bell will be rung and the printing mechanism controlled by the electro-magnet will be set in operation, as hereinafter described. The dog $J^3$ will lock the wheel K, by means of a notched rim $k$, at the position to which the wheel is rotated by drawing down the stop $K^4$ and retain it in that position until the dog is lifted, which will be effected in the same manner as above described with respect to the dog $J^2$, by the removal of the weight from the platform, causing the rack-bar $A^3$ to rise to its initial position. The wheel K has the peripheral rim $k^{10}$, upon which is placed the rubber ring $k^{11}$, containing type-faces adapted to imprint the figures indicating the height, and said figures will be brought to the proper position to make the imprint by the rotation of the wheel, as above described. The shaft E has secured to it in front of the sleeve H the wheel $E^8$, which has a toothed rim $E^{80}$, similar to the toothed rims of the wheels $G^{60}$ and K, and the rim $E^{81}$, which carries a printing-ring $E^{82}$, having type-faces adapted to register weights.

It will be understood that the type-faces of the three rubber rings are in the same cylindrical surfaces about the axis of the shaft E.

I will now describe the printing mechanism and its operation. This mechanism is mounted in a suitable frame or frames secured to the case, which will be referred to as the description proceeds, the use being to imprint on a card the weight, height, and pull indicated by the position of the wheels. I provide the card-receptacle N, (see Fig. 5,) adapted to contain a large quantity of cards in a vertical pile, said receptacle being formed of four angle-shaped corner-posts N' N' N' N', suitably joined together at top and bottom by open rectangular frames $N^2$ and $N^3$, respectively. This card-receptacle, so far as described, is simply a rectangular vertical channel, through which the cards may fall, lying horizontally, and from which they may be discharged from the lower end as they enter at the upper end. To the lower end of this receptacle, and in particular to the lower rectangular frame $N^3$, I pivot at $n^4$ the tilting platen or bed $N^4$, said bed extending underneath the lower open end of the receptacle $N^3$ and adapted to receive the cards successively as they are delivered from the receptacle. In this bed, at the end underneath the receptacle, I provide the sliding card-feed plate $N^{40}$, the bed being cut away sufficiently to admit the feed-plate into it, said feed-plate being flush with the surface of the bed, except as to a portion $N^{41}$ at the inner end, which is raised about the thickness of a card, forming thereby a shoulder $n^{41}$, which may engage behind the edge or bottom card of the pile of cards in the receptacle N and push it out from under the remainder of the pile, as hereinafter more particularly explained. The feed-plate $N^{40}$ does not occupy the entire width of the bed $N^4$ at its upper surface, and it is preferably retained and guided in its slide-bearings in the bed by its beveled edges $n^{40}$ engaging in the undercut channel under the overhanging flanges $n^{41}$, projecting from the sides of the bed. The cards are thus supported at the ends on the portion of the bed which constitutes these flanges $n^{41}$, and only under the part intermediate those flanges they rest on the upper surface of the feed-plate $N^{40}$. The bed has marginal ribs or flanges $N^{42}$ extending up substantially the thickness of the card, and the said flanges or ribs contact the bottom of the receptacle N at the ends of the bottom rectangular frame $N^3$. This leaves space equal to the thickness of the card between the plane of the upper surface of the bed and the lower edges of the sides of the rectangular frame $N^3$. The platen or bed $N^4$ is pivoted at $n^4$ to the rectangular frame $N^3$ approximately in the line of the inner lower edge $n^3$ of the outer side of the rectangular frame $N^3$, so that the tilting of the bed over the pivotal line does not appreciably change the distance between that edge and the plane of the bed on which the card rests. To the vertical flanges $N^{42}$ of the bed are secured the horizontal flanges or guards $N^5$, which extend in width a short distance, overhanging the surface of the bed between the flanges $N^{42}$, and forming thereby lateral guide-channels, in which the edges of the cards may run as they are fed out, and serving to retain the cards between the flanges $N^{42}$ and on the upper surface of the bed where they are being printed and fed. The bed or platen $N^4$ has the slot $N^{44}$, and the feed-plate $N^{40}$ has the lug $N^{43}$ extending downwardly from it through said slot to afford means for connecting operating parts to the feed-plate. The transverse flanges $n'$ of the inner corner-posts N' N' extend down past the plane of the upper surface of the platen $N^4$ and constitute a guard, which will prevent the escape of a card inward; but the corresponding flanges of the outer corner-posts of the card-receptacle extend only far enough to be joined to the bottom frame $N^3$ and do not protrude below the plane of the edge $n^3$ of the inner side of the frame $N^3$, thus permitting the cards to be fed out under that edge. It will be evident that a pile of cards being placed in the receptacle N, the feed-plate $N^{40}$ being first drawn in, so that the bottom card of the pile will rest upon its upper surface and its inner edge against the shoulder $N^{41}$, if the feed-plate is pushed outward a distance equal to the width of the card the shoulder $n^{41}$ will engage the bottom card and push it before it outward under the edge $n^3$ of the bottom frame, and the next card above will then rest upon the raised part $N^{41}$ of the feed-plate, and that if the feed-plate be drawn back to its first position the second card will drop into the position from which the first was pushed, and the process may be repeated, each card pushing the one which preceded it on over the platen or bed $N^1$, the cards being kept edge to edge and prevented from slipping over each other by the horizontal flanges $N^5$, which leave only room for the thickness of one card between them and the bed. I cause the feed-plate to be thus reciprocated, and at the same time cause the tilting platen $N^4$ to be rocked upward toward the type-faces on the wheels $G^{60}$, K, and $E^8$, and the cards therein to receive the imprint from those wheels before being discharged by the following mechanism. P is a windlass or drum whose shaft $p$ is journaled in the frame $P'$, which is supported on the case B, and which is actuated by the descent of the weight $P^{55}$, drawing the cable $P^{50}$, which passes from the windlass P, to which it is attached and around which it is wound, over a suitable pulley $P^{56}$ and sustains said weight attached to its end. The windlass-shaft has rigid with it the gear-wheel $P^2$, which meshes with and drives the equal gear-wheel $P^3$, whose shaft $p^3$ extends from the frame $P'$ rearward and has secured to its rear end the double hopper $p'$, which is located directly below the discharge-mouth of the tilting chute $C'$ and in position to receive the coin when it drops from the chute. This hopper is designed to catch the coin and is flared to facilitate that result, and being designed to be reversed between consecutive instances of use it is made double, as illustrated, widening from the middle line to both upper and lower sides. Immediately below the hopper $p'$ is located the electric contact-button $k^{62}$, which is adapted to be in circuit with the battery D through the wire $k^{53}$, to one pole of the battery, and through the coin which may rest in the hopper contacting the button, the hopper with which such coin will be also in contact, the shaft $p^3$, the contact-pieces $k^{51}$, binding-screw $k^{54}$, wire $k^{50}$, electro-magnet M and wire $m$, push-button $M'$, wire $m^2$, and wire $k^{60}$ to the other pole. It will be noticed that this circuit may be broken at two points—viz., at the hopper $p'$ by the absence of a coin and at the push-button $M'$ when it is not depressed to close the circuit. The push-button $M'$ is accessible on the outside of the case and is designed to be pushed in after all the desired tests have been made and the proper coin deposited. The coin will then be in position to connect the circuit at the hopper, and the circuit being closed by the push-button the electro-magnet M will be energized and the armature $M^2$ will be attracted. This armature is mounted on the lever O, and said lever is adapted, under the pressure of the spring $O'$, to operate as a catch to arrest and lock the train of gears which commences with the wheel $p^4$, which is connected by pawl and ratchet $P^{40}$ $P^{41}$ with the windlass P, so that the rotation of the latter caused by the descent of the weight $P^{55}$ rotates said wheel $P^4$. This train comprises wheels $P^{42}$ and $P^{43}$ on one shaft, the former meshing with the wheel $P^4$ and the latter with wheel $P^{44}$ on a shaft on which is the wheel $P^{45}$, which engages the screw-shaft $P^{46}$, said screw-shaft having a thread of such great pitch that the wheel $P^{45}$ can rotate the screw-shaft. The train is calculated to give the last shaft $P^{46}$ greatly accelerated motion, and said shaft has the radial vanes $P^{47}$ $P^{47}$ to check the speed, and so regulate the speed of the train. Said shaft has also the arm $P^{480}$, whose hub is tightly but not rigidly fixed on the shaft, so that it can turn thereon, but not freely, and with said arm the lever O collides when it locks said train. The arm $P^{480}$ will slip slightly on the shaft when it strikes the lever O and prevent too sudden stoppage of the train. The wheel $P^4$ meshes with and drives the gear $P^5$, and rigid with the shaft $p^5$ of said gear $P^5$ is the beveled gear $P^{50}$, which drives the equal gear $P^{51}$ on the shaft $p^{51}$, which is journaled in bearings supported on the case under the outer end of the printing-platen or tilting bed $N^4$, and underneath said bed $N^4$ there is fixed eccentrically on said shaft the disk or cam-wheel $P^{52}$, which, as it revolves once in each revolution by reason of its eccentricity to the shaft, raises the bed and allows it to fall. On the shaft $p^{51}$ there is fixed the eccentric wheel $P^6$, which is peripherally grooved, and said groove receives the collar $P^{60}$, to which is connected the arm $P^{61}$, which extends horizontally inward and is then bent sideward and connected to the lug $N^{43}$ of the feed-plate $N^{40}$. The rotation of the shaft $p^{51}$ will thus lift the bed $N^4$ and reciprocate the feed-plate $N^{40}$ once in each revolution of the shaft. The eccentrics $P^{52}$ and $P^6$ are so placed on the shaft that the bed is raised while the feed-plate is being drawn back—that is, inward—and the feed-plate is pushed forward while the bed is descending. The wheel $P^4$ has twice as many teeth as the wheel $P^5$, so that half a revolution of the former wheel revolves the latter wheel and the shaft $p^{51}$ once. Rigid with the wheel $P^4$ is the disk $P^{48}$, which has two notches $p^{48}$ diametrically opposite, and the lever O has a finger $O^2$, projecting toward the edge of the disk $P^{48}$ and adapted to engage the notches $p^{48}$ as the disk revolves, and when so engaged the disk and the entire train driven by the wheel $P^4$ are locked stationary. When the push-button $M'$ is depressed and the circuit closed at that point, if a coin is in contact with the contact-button $k^{52}$, closing the circuit there, the electro-magnet M will be energized and its armature attracted and the lever O withdrawn from the arm $P^{480}$ and the train driven by the weight $P^5$ will be set in motion. The first effect of the rotation of the train will be that the shaft $p^3$, being rotated and turning the hopper $p'$, will cause the coin to drop out of it off from the contact-button $k^{52}$ into the coin-receptacle, which may be placed in the bottom of the case, thus breaking the circuit and leaving the electro-magnet M inert. This might happen before the wheel P⁴ had revolved far enough to carry the notch $p^{48}$ on the disk P⁴⁸ out of reach of the finger O², and the lever O being released from the magnet might possibly catch again in said notch, and so cause the revolution of the train to cease without accomplishing its purpose. To prevent this I provide the spring-catch P⁷, secured to the frame P′ and projecting above the upper end of the lever O and adapted to engage and lock the lever when the latter is attracted toward the magnet. The lever will thus be held out of engagement with the disk P⁴⁸, even after the breaking of the circuit leaves the magnet powerless to hold it; but in order that it may be released from the catch in time to lock the disk by engaging in the opposite notch $p^{48}$, when it is brought round by the half-revolution of the disk, I provide a pin P⁴⁹, projecting laterally from the disk P⁴⁸ at a short distance from each of the notches $p^{48}$ and adapted to engage the nose of the catch P⁷ as the disk revolves and after the notch $p^{48}$ has moved out of reach of the finger O² of the lever. As soon as this pin engaging the nose of the latch lifts it from its engagement with the lever O the spring O′ will rock the lever O, carrying the armature away from the magnet, and bring the finger O² onto the edge of the disk P⁴⁸, and it will ride on the edge of this disk until the opposite notch $p^{48}$ reaches it, and will then drop into the notch and arrest the train. There will thus be made one-half a revolution of the wheel P⁴, which will cause one complete revolution of the wheel P⁵ and of the shaft $p^{51}$ and the eccentrics thereon whenever the conditions above stated exist, by which the circuit through the push-button M′ and the coin on the button $k^{52}$ is closed.

It is designed that the push-button M′ shall be operated after the user has performed all the operations with the machine which he desires to have recorded on the card—that is, after he has stood upon the platform and been weighed, measured his height by pulling down the stop K⁴, and made the test with the lifting mechanism by means of the handles G. These preceding operations will have caused the wheels to have revolved, as described, bringing the proper figures on their type-faced rims respectively into line at the lower side immediately over the lower end of the tilting bed or platen N⁴, and the closing of the circuit by means of the push-button M′ setting into operation the mechanism described whereby the end of the tilting bed N⁴ is lifted will force the card up against the type-faces and cause it to receive the imprint, which will cause the recording of the weight, height, and pull, and then, while the bed is descending, will feed it out by pushing forward the feed-plate N⁴⁰, said feed-plate having been pulled back while the bed was being pushed up to make the imprint. The forward movement of the feed-plate having pushed the imprinted card off from the bed-plate N⁴ the card will be received in the card-chute Q, which is curved downward and back under the shaft $p^{51}$ and at the same time is twisted so as to be inclined down forward at the lower part, causing the card to turn over as it slides around in the chute and dropping the forward edge of the card down, so that after passing around a curve of one hundred and eighty degrees it stands inclined forward and will slide from the chute and be delivered through the opening Q′ in the front of the case onto a suitable tablet prepared to receive it, the imprint being on the under side as it is thus delivered, so that it cannot be read by bystanders. When the platen or bed N⁴ is forced upward to imprint the card, the V-shaped tooth $n^{40}$ on the edge of said bed enters between consecutive teeth on the rim E⁸⁰ and brings the wheel E⁸ into exact position with the type-faces on the printing-rim in line with those on the wheels G⁶⁰ and K, in respect to which a similar function will have been performed by the pawls J² and J³. It will be observed that a circuit through the magnet M is also closed, provided the coin is in the proper position on the button $k^{52}$, whenever the height-measuring stop is operated and the push-button therein is pressed. It is intended that this shall be the last operation performed, and that when it is so done it will not be necessary to operate the push-button M′, and if the imprint is obtained by means of closing the circuit through the stop no effect will be produced by closing the circuit again by means of the push-button, because the coin will have dropped from the contact-button $k^{52}$ when the circuit was first closed.

If the operator does not desire to use the height-measuring device, the push-button becomes serviceable as the only means of obtaining the recording on the card of the weight and lift, or of the weight alone if the pull is not used.

If the operator desires only to ascertain his weight and does not desire to obtain the registration of it on the card, he may learn this from the position of the index-hand on the dial, and having stepped off the scale, the index-hand and the mechanism which operates it will return to the initial position, as described, and when either of the circuits by which the printing mechanism is set in operation is next closed, either by the push-button or by the button in the height-measuring stop, the printing mechanism will be operated and a card delivered which will record zero as to weight, height, and lift, if the circuits have been closed, without operating the weighing, height-measuring, or lifting devices, and if the machine is next used in all its said parts and a coin duly deposited the record and registration will be correct for such use and both the coins—that is, the one left in the hopper from the last preceding use and the new one deposited—will fall together into the basket.

Figures 1, 2:
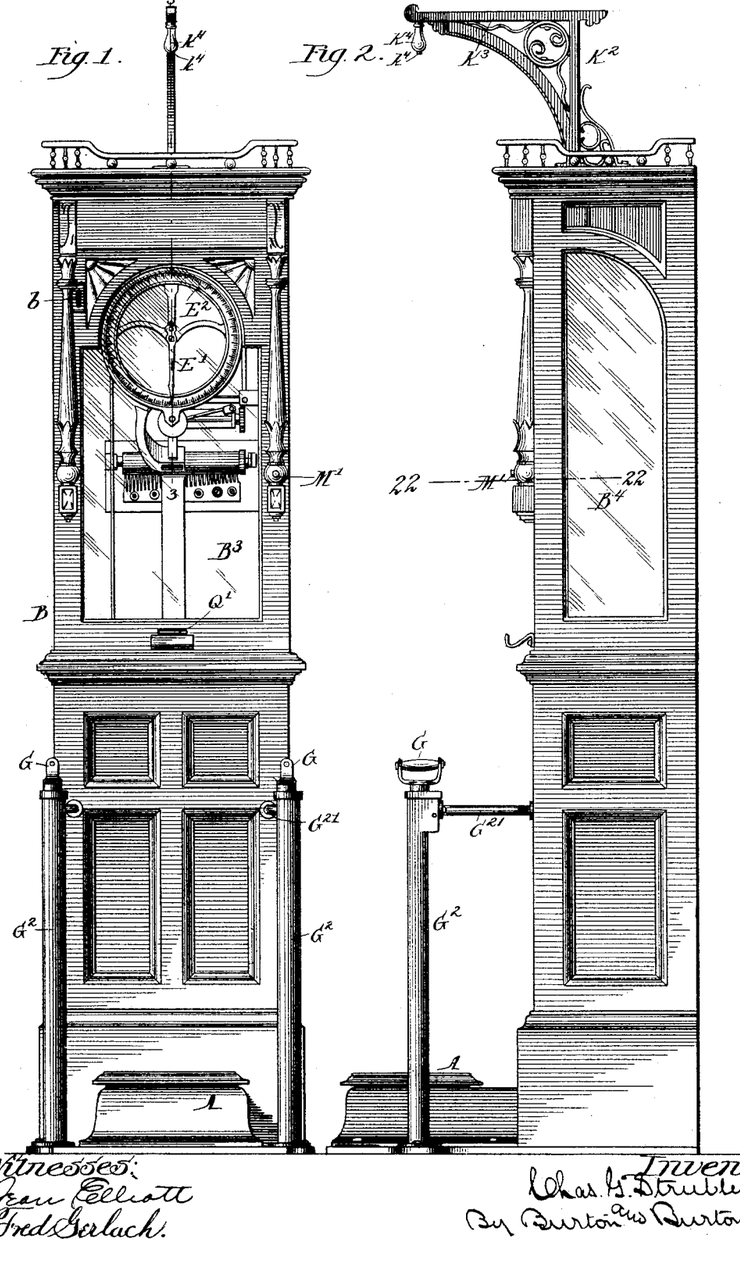
Figure 1 is a front elevation.
Fig. 2 is a side elevation.
Figure 3:
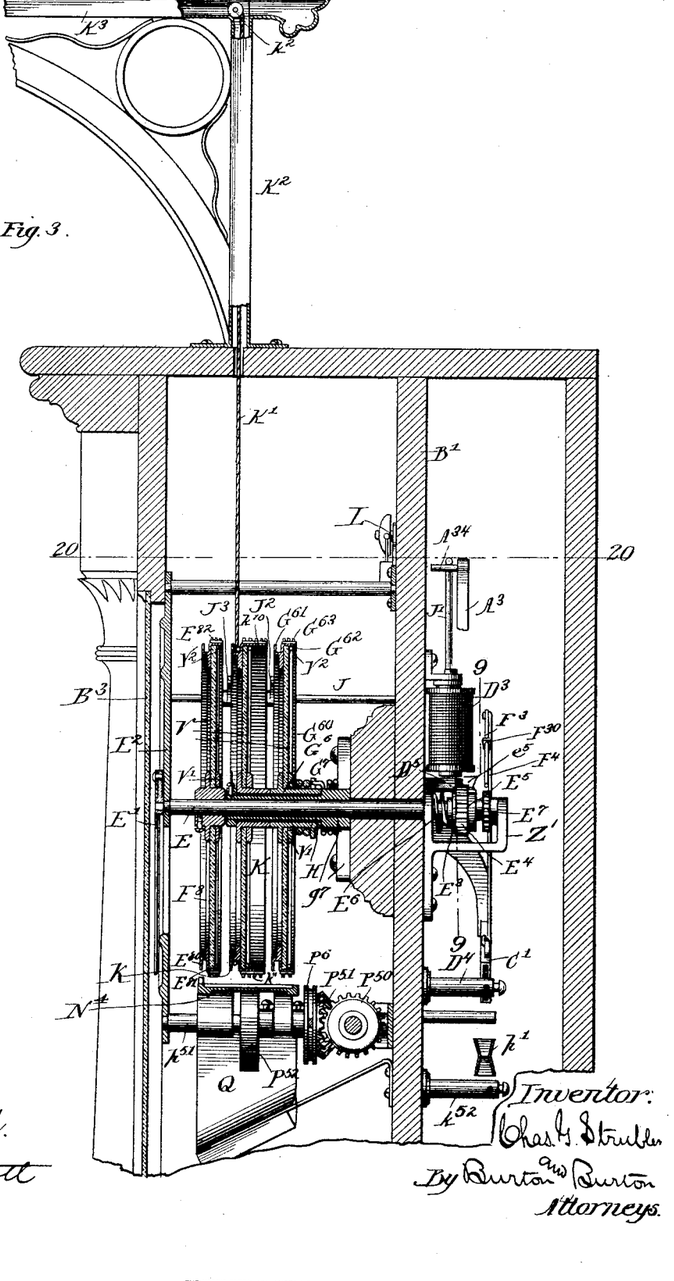
Fig. 3 is a vertical section on an enlarged scale at the line 3 3 on Fig. 1.

The fixed coin-chute C is of such dimension as to admit and allow passage through it of any selected coin by which it is desired to cause the mechanism to be controlled, as described. If, for example, the coin selected be the five-cent nickle, that coin will pass freely, but without any more play than necessary for its certain passage through the chute. It will be observed, Fig 1, that the coin is inserted in a vertical position in a plane from front to rear; but the fixed chute C is twisted ninety degrees between its entrance at the front of the case and its delivery onto the oscillating chute and is cut away on the convex side at the point c, leaving only narrow flanges c' c' at the edges of that side to guard the coin in its passage around the convex and twisted part of the chute. If a coin of less dimension than the required coin be inserted, it will be thrown out at the opening c, this result being insured both by the fact that the coin will in any event be without a guard at one edge, even if it follows the opposite edge of the chute closely, so that it rests on one of the guarding-flanges, and if it moves in the middle it will have no guard at either edge, and even when most completely guarded, as at one edge, the other edge will be tipped out by the centrifugal force in passing around the curve of the chute, so that it will not reach the tilting chute, and will therefore never operate to close the circuit. Thus any improper coins inserted will fail to cause the registering mechanism to be operated in any respect. It will be understood, of course, that a coin of too great dimensions cannot be entered through the coin-aperture.

Figure 5:
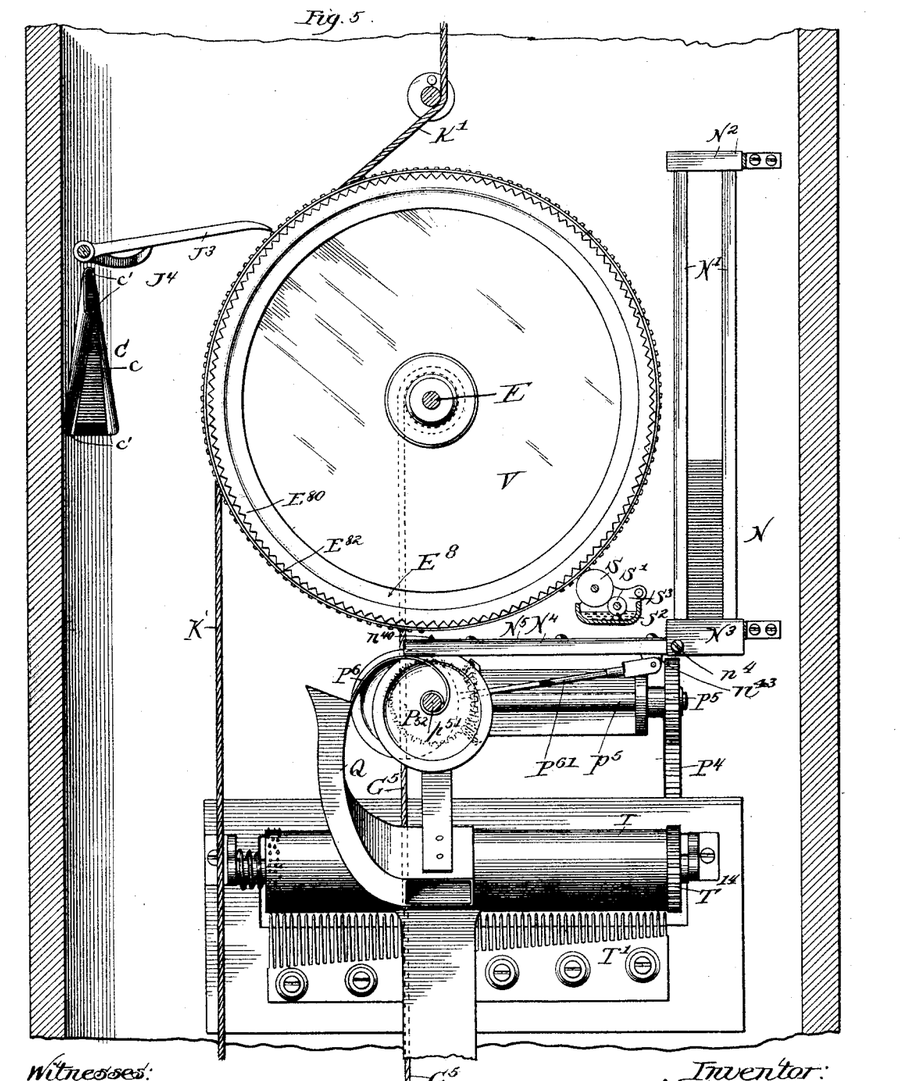
Fig. 5 is a section at the line 5 5 on Fig. 4.
Figure 15:
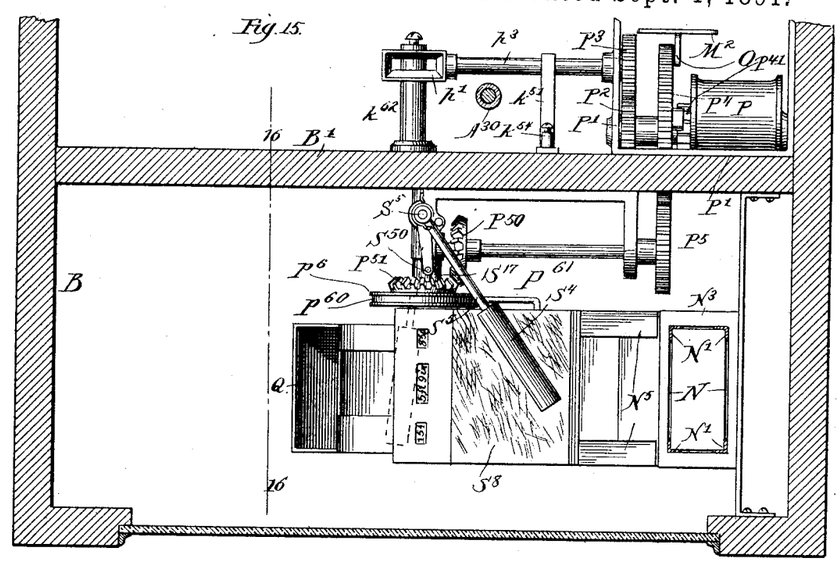
Fig. 15 is a section at 15 15 on Fig. 4, but showing a modification in respect to the inking mechanism.
Figure 16:
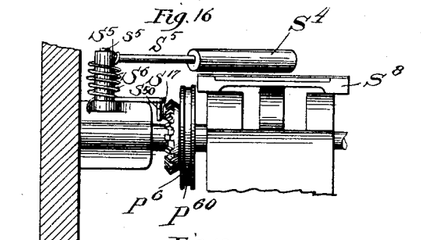
Fig. 16 is a section at 16 16 on Fig. 15, showing in detail said modified inking mechanism.
Figures 17, 18:
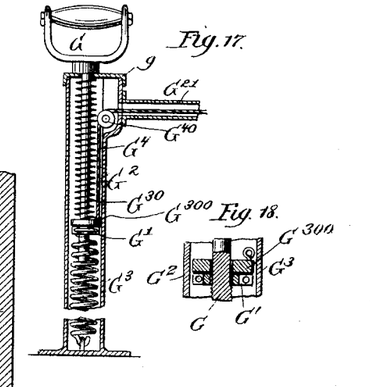
Fig. 17 is a vertical section through the standards containing the lifting-handles, showing the mechanism therein in side elevation.
Fig. 18 is a detail axial section of the pull-rod of the lifting mechanism and a disk and stop-collar thereon, to which certain springs are attached. (Fully shown in Fig. 17.)
Figure 19:
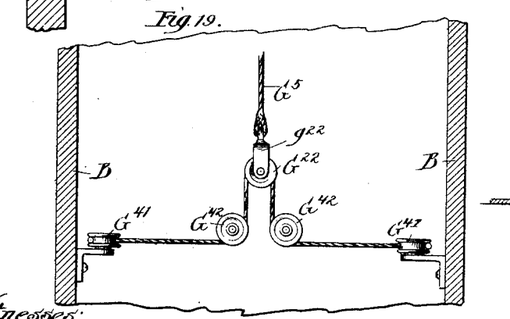
Fig. 19 is a sectional elevation of the cable and the guide-pulleys by which the pull-recording mechanism is actuated, section through the case being made at 19 19 on Fig. 4.
Figure 20:
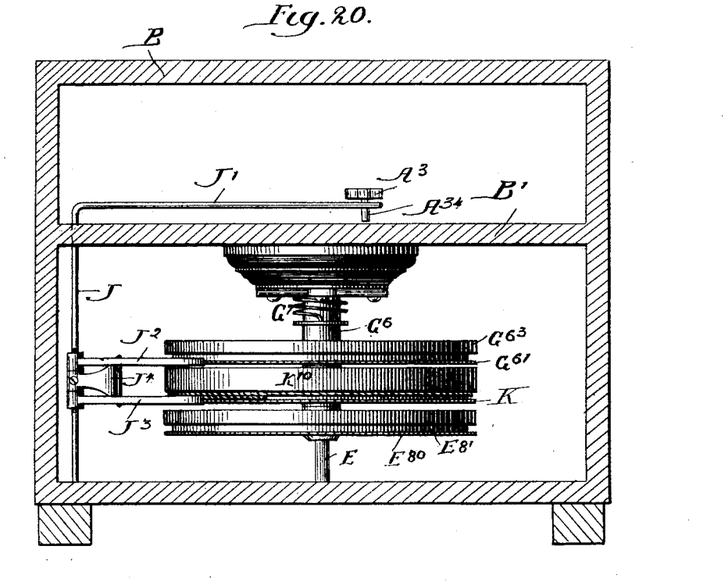
Fig. 20 is a sectional plan of certain locking devices for the registering-wheels, section being made through the case at the line 20 20 on Fig. 3.
Figure 21:
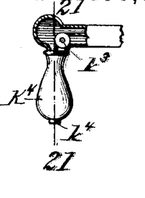
Fig. 21 is a section at the line 21 21 on Fig. 3.
Figure 22:
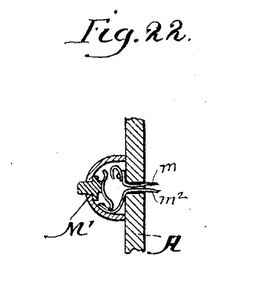
Fig. 22 is a section at the line 22 22 on Fig. 2.

The rubber printing-rings $E^{52}$, $K^{11}$, and $G^{63}$ may be inked by any suitable mechanism, as the inking-roller S, Fig. 5, which may receive the ink from the roller S', which dips in the ink-vat $S^2$, all of said parts being sustained on a frame $S^3$, supported on the case in such position that the roller S contacts the printing-wheels on their type-faces and inks them as they revolve. Another device, however, (see Figs. 15 and 16,) may be used to insure fresh ink on the type-faces at the instant of printing, as might not be the case if the distance which any one of the printing-wheels were rotated were less than the distance from its contact with the inking-roller to the line of contact with the card at the instant of printing. An inking-roller $S^4$ is journaled at the end of the arm $S^5$, which is pivoted on a vertical pivot $s^5$ and adapted to oscillate in a horizontal plane between the platen $N^4$ and the printing-face of the wheels $G^{60}$, $E^8$, and K. A spring $S^6$, connected to said arm, tends to hold the arm at the position shown in full lines in Fig. 15. A pin $S^{17}$ projects from the wheel and engages the end $S^{50}$ of the arm $S^5$ when the printing mechanism starts and swings the roller $S^6$ around over the ink-tablet $S^8$, which is supported by the platen $N^4$ above the latter, and then under and in contact with the type-faces, inking them, and then, the projection $S^{17}$ having run off the arm $S^{50}$, the spring $S^6$ retracts the arm $S^5$ to the initial position. All the movements will occur during the first quarter of the rotation of the wheel and before the platen has risen far enough to prevent the ink-roll passing between the platen and the type-wheel. When this construction is adopted, the platen will be located farther from the type-wheels than shown in the principal figures and the eccentricity of the wheel $P^{52}$ will be increased to adapt it to give correspondingly greater movement to the platen.

As an appendage to this scale a musical device may be added consisting of a cylinder T and reed-plate T', of the well-known construction, the cylinder being driven by a train deriving motion from the printing-mechanism train and calculated to give the cylinder one revolution during each complete revolution of the shaft $p^{51}$, so that while the operator is waiting for the printing of and delivery of the card he may be entertained by the music. I find it convenient to drive the musical-cylinder train from the wheel $P^4$, and, as illustrated, the train comprises the wheels $T^{12}$, $T^{13}$, and $T^{14}$, ending with the wheel $T^{14}$, which is rigid with the cylinder.

The wheels $E^8$, $G^{50}$, and K are each composed of a hub and a rim, which are of metal, and an intermediate annular body V, of glass, the hub and the rim being formed to admit the glass from one side, the glass being then retained in place by the guard-rings V' and $V^2$, which are cemented or soldered to the hub and rim respectively. The front and sides of the case are also made of glass plates $B^3$ and $B^4$, respectively, suitably set in the wooden frame-work. The greater part of the mechanism can thus be readily observed from the exterior.

The fact that only one of the measurements indicated by the mechanism—to wit, the weight measurement—is visible from the exterior of the case, while the measurement of height and lift cannot be known until the printed card containing the record of such measurement is delivered, adapts it to be used in a manner to test the user's ability to estimate accurately the relation numerically of the amount which he lifts or pulls to his weight or to test the accuracy of the estimate of a bystander as to the relation numerically between the weight in pounds of the user, as indicated upon the dial, and his height in feet and inches, not yet indicated visibly. In short, the machine indicating visibly one quantity, and, for the time being, invisibly another quantity capable of being compared with the first numerically, and the second indication or record being ascertainable at the will of the user after the first quantity is visibly indicated, opportunity is afforded for the estimate of the numerical relation of the invisible to the visible quantity, or, in case of the pull, opportunity is afforded for creating the invisible record and making it equal a given estimate. To take advantage of this feature, the mode of use of this machine may be to offer rewards to the user who shall pull or lift an amount bearing a specified relation to his weight, as indicated upon the dial, so that the user will be obliged while pulling or lifting to estimate the amount of his own effort, and his skill in such estimate will thereby be exerted and tested; or the machine may be made a source of amusement by permitting bystanders to estimate the ratio of height of users to their weight before the card is delivered.

I desire to be understood in this description and in my claims as using the word "register" and its derivatives as signifying "to indicate by position" without regard to whether the matter thus indicated or registered is or is not further permanently indicated or recorded.

I do not in this application claim specifically the mechanism for printing nor for delivering cards printed, nor the specific mechanisms for measuring height or measuring the pull or lift, nor the specific construction of the registering and recording wheels in respect to the employment of metal rim and glass body, as described, since I design to claim all said matters in other applications filed as divisions hereof.

I claim—

1. In a coin-controlled scale, in combination with the registering mechanism, the platform and a spring which resists its descent and restores it to elevated position, mechanism operated by such spring and actuating the initial portion of the registering-mechanism train, said train having consecutive wheels $E^4$ and $E^5$, which have play relatively to each other through part of their rotation and which have stops which engage and communicate motion from one to the other at the limit of such play, and a spring $E^6$, which actuates the portion of said train subsequent to the wheel $E^5$ and tends to retract the registering-train to zero position, substantially as set forth.

2. In a coin-controlled scale, in combination with the platform and a rod or bar actuated thereby, the registering or indicating devices and the train which operates them, said train comprising a rod or bar extending contiguous to the rod or bar actuated by the platform, and suitable stops whereby the latter bar operates the former in the direction in which the latter is actuated by the rising of the platform, the wheels $E^4$ and $E^5$ in the registering-mechanism train, the former actuated by said bar of said train, said wheels having projections $e^4$ and $e^5$, respectively, whereby the former actuates the latter and the remainder of the train when it is itself actuated by the movement of the bar, which occurs when the platform descends and arrests the reverse movement, and a spring tending to communicate such reverse movement to the wheel $E^5$, substantially as set forth.

3. In combination, the registering-mechanism train and the independent retarded train, having parts connected with said trains, respectively, which are engaged at the zero position of the registering-train, a lever controlled by the retarded train and adapted to lock the registering-train, as set forth, the registering-mechanism train comprising two consecutive wheels which have play relatively to each other through part of their rotary motion and which are engaged by stops on said wheels, respectively, at the limit of such play, and a spring which actuates the portion of said train subsequent to the second of said consecutive wheels, the part of said train which is engaged with the retarded train being antecedent to the first of said wheels and withdrawing from its engagement with the retarded train when the registering-train moves from zero position, the engaged part of the retarded train being adapted to move a short distance only in the path of the engaging part before effecting the engagement of its controlled lever with the registering-train to lock the same, substantially as set forth.

4. In combination with the registering mechanism, the scale-platform and the spring which resists its descent and restores it to elevated position, the mechanism actuated by such spring and actuating the initial part of the registering-mechanism train to reverse it after registration, a lever which locks the final part of said train at the limit of its registering action, said registering mechanism comprising two consecutive wheels $E^4$ and $E^5$, which have play relatively to each other through part of their rotation and which have stops which engage and communicate motion from one to the other at the limit of such play, and the spring which actuates the final part of said registering-mechanism train, said locking-lever being disengaged by the initial part of the train at the latter part of its reverse action, substantially as set forth.

5. In a coin-controlled scale, in combination with the registering mechanism, a dog which normally locks it, and an electric circuit which when energized actuates the dog to release the train, a coin-chute adapted to deliver the coin in position to close the circuit, such chute being movable at one part, and a support for such movable part connected to the registering mechanism, such support being withdrawn and allowing the chute to move and drop the coin from the circuit-closing piece when the registering mechanism operates, substantially as set forth.

6. In a coin-controlled scale, in combination with the registering-wheel having a printing-periphery, the mechanism which operates said wheel, a bed or platen adapted to contain a card to be printed, located near to and adapted to be advanced against said printing-periphery, a train of mechanism for advancing and retracting the card-carrying bed, a dog which locks said mechanism, an electric circuit which controls the dog and releases the train when the circuit is energized, a push-button in said circuit accessible at the outside of the case, said circuit comprising at one point two non-contacting lodgments adapted to be electrically connected by suitable coin lodged thereon, and a coin-chute adapted to deliver the coin onto such lodgments, substantially as set forth.

7. In a coin-controlled scale, in combination with the registering-wheel having a printing-periphery, the train of mechanism which operates said wheel, a card-carrying platen located near and adapted to be advanced against said periphery, a train of mechanism which advances and retracts the platen, a dog which locks said train, an electro-magnet which controls said dog to release the train when energized, the electric circuit in which said magnet is contained, said circuit being normally open and adapted to be closed by a push-button accessible outside the case and being normally open at another point within the case between two lodgments adapted to be connected by a suitable coin lodged thereon, and a coin-chute adapted to deliver the coin onto such lodgments, one of such lodgments being movable and connected to the platen-actuating train and moved thereby to dislodge the coin, substantially as set forth.

8. In a coin-controlled scale, in combination with the registering-wheel and the train of mechanism which operates it, the dog which locks it, and the electro-magnet which operates the dog to release it, the card-carrying platen and the train of mechanism which operates it, a dog which locks said train, an electro-magnet which controls said dog to release it, an electric circuit which energizes the first-mentioned magnet and normally open at one point between two lodgments adapted to be electrically connected by a suitable coin, one of said lodgments being movable and connected to the registering-wheel train and moved by said train to dislodge the coin, the circuit which energizes the second-mentioned magnet normally open between two lodgments adapted to be electrically connected by a suitable coin lodged thereon, one of said lodgments being movable and connected to the platen-operating train and moved thereby to dislodge the coin, the coin-chute adapted to deliver the coin onto the first-mentioned lodgments, the second-mentioned lodgments being in position to receive the coin when dislodged from the first, and a push-button in the second circuit accessible outside the case, substantially as set forth.

9. In a coin-controlled scale, in combination with the weight-registering wheel and the train of mechanism which operates it, a height-measuring device consisting of a vertically-movable stop overhanging the platform, an electric-circuit wire provided with a contact-making button in said stop, the height-measuring wheel actuated by suitable connection with said movable stop, said height-measuring wheel being provided with a printing-periphery, a card-carrying platen located near to and adapted to be advanced against said printing-periphery, a train of mechanism which actuates said platen to advance and retract it, a dog which locks said train, an electro-magnet which operates the dog to release the train, said magnet being located in the electric circuit with the contact-making button in the height-measuring stop, said circuit being open at one point between two coin lodgments adapted to be electrically connected by suitable coin lodged thereon, a coin-chute and two lodgments onto which said chute is adapted to deliver the coin, and connections from one of said lodgments to the weight-registering-wheel train, whereby said train moves said lodgment to cause the delivery of the coin onto the lodgments in said circuit, substantially as set forth.

10. In combination with the weight-measuring mechanism, printing mechanism by which the indication of said weight-measuring mechanism is recorded, an electric circuit which controls the operation of said printing mechanism, having a normally-open gap, said weight-measuring mechanism being coin-controlled and adapted to deliver its operating-coin in position to close said gap, and the case which incloses said mechanism and circuit, said circuit having another normally-open gap and comprising a contact-button accessible outside the case to close said gap, substantially as set forth.

11. In combination with the weight-measuring mechanism, printing mechanism by which the indication of said weight-measuring mechanism is recorded, comprising devices for delivering the card bearing such printed record away from the printing mechanism, the case which incloses said mechanism, and the card-chute extending from the delivery-point of the printing mechanism through the wall of the case and discharging outside thereof, an electric circuit which controls the operation of said printing and delivering mechanism, said circuit having a normally-open gap, the weight-measuring mechanism being coin-controlled and adapted to deliver its operating-coin in position to close said gap, said circuit having another normally-open gap, and a contact-button accessible on the outside of the case to close said gap, substantially as set forth.

12. In combination with the height-measuring mechanism, the printing mechanism which records the indication of said height-measuring mechanism, the electric circuit which controls said printing mechanism, having a normally-open gap, and the coin-controlled weight-measuring mechanism adapted to deliver its operating-coin into position to close said gap, substantially as set forth.

13. In combination with the height-measuring wheel and the printing mechanism by which the indication of such wheel is recorded, the cable which operates said wheel, comprising insulated electric conducting-wires forming part of a circuit which controls the operation of the printing mechanism, said circuit having a normally-open gap, and a coin-controlled weight-measuring mechanism adapted to deliver the coin into position to close said gap, substantially as set forth.

14. In combination with a height-measuring wheel, the printing mechanism which records the indication of said wheel, the electric circuit which controls said printing mechanism, the cable which operates the height-measuring wheel, comprising insulated electric conducting-wires which form part of said circuit, said circuit having a normally-open gap, and the coin-controlled weight-measuring mechanism adapted to deliver the operating-coin into position to close said gap, substantially as set forth.

15. In combination with the height-measuring mechanism, the printing mechanism which records the indication of said height-measuring mechanism, the case in which said mechanism is inclosed, said printing mechanism comprising devices for delivering the printed card therefrom, and the card-chute leading from the delivery-point of said printing mechanism through the wall of the case to deliver the card outside thereof, the electric circuit which controls said printing and delivering mechanism, having a normally-open gap, and a coin-controlled weight-measuring mechanism adapted to deliver its operating-coin into position to close said gap, whereby the record of the height-measuring mechanism is delivered outside the case by the action of the weight-measuring mechanism, substantially as set forth.

16. In combination with a height-measuring wheel and the printing mechanism by which its indication is recorded, a height-measuring stop and connections therefrom by which the wheel is operated, an electric circuit which controls the operation of the printing mechanism, comprising a contact-button in the height-measuring stop and having a normally-open gap in addition to the one closed by said button, and a coin-controlled weight-measuring mechanism adapted to deliver a coin into position to close said gap, substantially as set forth.

17. In combination with a height-measuring wheel and the printing mechanism by which its indication is recorded, a height-measuring stop and connections therefrom by which the wheel is operated, an electric circuit comprising a contact-button in said stop and an electric bell in said circuit having a normally-open gap in addition to the one closed by the contact-making button in the stop, and the coin-controlled weight-measuring mechanism adapted to deliver the coin into position to close said gap, substantially as set forth.

18. In a coin-controlled scale, in combination with the weighing-platform, registering-wheels operated independently of said platform and having printing-peripheries, a card-carrying platen and mechanism for operating it to obtain an imprint from said printing-peripheries, an electric circuit which controls the operation of said platen-actuating mechanism, said circuit being open between two lodgments adapted to be connected by a proper coin lodged thereon, a coin-chute adapted to deliver the coin against two lodgments, which arrest it before it reaches the lodgments in said circuit, and mechanism whose operation is dependent upon the descent of the weighing-platform, one of said coin-arresting lodgments being connected to said mechanism and moved thereby to dislodge the coin when the platform descends, whereby the actuation of the platen to produce the imprint from the printing-wheels is made dependent upon the depression of the platform, substantially as set forth.

19. In combination with the pull-measuring mechanism, the printing mechanism which records the indication of such pull-measuring mechanism, the electric circuit which controls said printing mechanism, having a normally-open gap, and a coin-controlled weight-measuring mechanism adapted to deliver the operating coin into position to close said gap, substantially as set forth.

20. In combination with the pull-measuring mechanism, the printing mechanism which records the indication of said pull-measuring mechanism, the height-measuring wheel and the cable which operates said wheel, the electric circuit which controls the printing mechanism, the height-measuring-wheel-operating cable comprising insulated electric conducting-wires which form part of said circuit, said cable terminating in a stop adapted to be moved to contact the head of the user to measure his height, said stop containing a contact-making button adapted to close the circuit through said wires in said cable, said circuit having another normally-open gap, and a coin-controlled weight-measuring mechanism adapted to deliver the operating-coin in a position to close said gap, substantially as set forth.

In testimony whereof I have hereunto set my hand this 3d day of January, A. D. 1890.

CHARLES G. STRUBLER.

Witnesses:
CHAS. S. BURTON,
JEAN ELLIOTT.